United States Patent
Beranger et al.

(10) Patent No.: US 11,947,058 B2
(45) Date of Patent: Apr. 2, 2024

(54) METHOD FOR PRODUCING A SOLID-STATE DIGITAL DETECTOR OF INCIDENT RADIATION

(71) Applicant: TRIXELL, Moirans (FR)

(72) Inventors: Murielle Beranger, Moirans (FR); Mohamed Zekhnini, Moirans (FR)

(73) Assignee: TRIXELL, Moirans (FR)

( * ) Notice: Subject to any disclaimer, the term of this patent is extended or adjusted under 35 U.S.C. 154(b) by 108 days.

(21) Appl. No.: 17/610,136

(22) PCT Filed: May 12, 2020

(86) PCT No.: PCT/EP2020/063244
§ 371 (c)(1),
(2) Date: Nov. 9, 2021

(87) PCT Pub. No.: WO2020/229499
PCT Pub. Date: Nov. 19, 2020

(65) Prior Publication Data
US 2022/0221597 A1  Jul. 14, 2022

(30) Foreign Application Priority Data
May 13, 2019  (FR) ...................................... 1904952

(51) Int. Cl.
*G01T 1/20*  (2006.01)
(52) U.S. Cl.
CPC ........ *G01T 1/20188* (2020.05); *G01T 1/2002* (2013.01)

(58) Field of Classification Search
None
See application file for complete search history.

(56) References Cited

U.S. PATENT DOCUMENTS

| | | | |
|---|---|---|---|
| 8,779,364 B2 * | 7/2014 | Nagano | G01T 1/20 250/361 R |
| 2012/0187298 A1 | 7/2012 | Sasaki et al. | |
| 2012/0187299 A1 | 7/2012 | Nagano et al. | |
| 2020/0371258 A1 * | 11/2020 | Iwakiri | G01T 1/2006 |

FOREIGN PATENT DOCUMENTS

| | | |
|---|---|---|
| CN | 107742628 A | 2/2018 |
| JP | 2012-13572 A | 1/2012 |

\* cited by examiner

*Primary Examiner* — Edwin C Gunberg
(74) *Attorney, Agent, or Firm* — BakerHostetler

(57) ABSTRACT

A method for producing a solid-state digital detector of incident radiation includes a photosensitive sensor and a radiation converter, comprising a. a step of growing on a first substrate a scintillating substance from the first substrate, capable of converting the incident radiation into a second radiation to which the sensor is sensitive, the scintillating substance comprising an upstream front face in the direction of propagation of the incident radiation, through which the incident radiation passes, and a downstream front face in the direction of propagation of the incident radiation, opposite the upstream front face; b. a step of holding the scintillator at the downstream front face of the scintillating substance; c. a step of separating the first substrate from the scintillator.

9 Claims, 3 Drawing Sheets

METHOD FOR PRODUCING A SOLID-STATE DIGITAL DETECTOR OF INCIDENT RADIATION

CROSS-REFERENCE TO RELATED APPLICATIONS

This application is a National Stage of International patent application PCT/EP2020/063244, filed on May 12, 2020, which claims priority to foreign French patent application No. FR 1904952, filed on May 13, 2019, the disclosures of which are incorporated by reference in their entirety.

FIELD OF THE INVENTION

The technical field of the invention is that of X-ray imagers and more particularly that of the conversion of X-rays into visible light by means of a scintillator. The invention relates to a method for preparing a transferred scintillator for a solid-state digital detector of X-radiation comprising a photosensitive sensor associated with a radiation converter. The fields of application of this type of detector are especially radiology: radiography, fluoroscopy, mammography, but also non-destructive testing.

BACKGROUND

The photosensitive sensor is generally made from solid-state photosensitive elements that are arranged in a matrix. The photosensitive elements are made from semiconductor materials, usually monocrystalline silicon for CCD or CMOS sensors, polycrystalline silicon or amorphous silicon. A photosensitive element comprises at least one photodiode, phototransistor or photoresistor. These elements are arranged on a substrate or integrated into said substrate, which is generally a carrier made of glass, of plastic (polymer) or metal or of another, synthetic material (carbon, alloy, ceramic, etc.) or of silicon.

These elements are generally not, or virtually not, directly sensitive to very short wavelength radiation, such as X-radiation or gamma radiation. For this reason, the photosensitive sensor is combined with a radiation converter that comprises a layer of a scintillating substance. This substance has the property, when it is excited by such radiation, of emitting radiation of longer wavelength, for example visible or near-visible light, to which the sensor is sensitive. The light emitted by the radiation converter illuminates the photosensitive elements of the sensor, which carry out a photoelectric conversion and deliver electrical signals that are usable by suitable circuits. The radiation converter will be called a scintillator in the rest of the description.

The scintillator may be made of gadolinium oxysulfide (GADOX or GOS) or of thallium-doped cesium iodide (CsI:Tl), or any other similar material that can be used for its properties of converting X-rays into light. In the case of a CsI:Tl scintillator, it may be evaporated directly onto the photodiode array or transferred after deposition.

In the transferred scintillator version, the scintillator (for example CsI:Tl) is evaporated onto a substrate and then bonded to the photodiode array. The substrate must be compatible with the method for producing the scintillator, which is carried out by vacuum evaporation. This imposes constraints in terms of mechanical stiffness to allow handling, of vacuum resistance, of temperature, etc. The choice of the substrate is therefore limited by the constraints for producing the scintillator. After bonding to the photodiode array, this substrate forms an integral part of the detector. It performs some absorption of incident X-rays, which is not desirable. It reflects some of the light emitted by the scintillator and thus has an effect on the performance of the detector (sensitivity, resolution). It contributes to the overall weight of the detector. However, it is desired to keep this weight as low as possible for portable applications. Lastly, it gives rise to differential thermal expansion between the photodiode array and the scintillator, which limits the use of the detector in terms of temperature (both in storage and in operation).

The scintillator substrate therefore fulfills a number of different functions: that of substrate for the growth of the scintillating substance forming the scintillator and that of reflector in the detector. These functions have different requirements which are difficult to reconcile. For example, requirements for low X-ray absorption or low weight would readily direct the choice toward polymers or thin films. However, polymers have low heat resistance which is not suitable for the function of growth substrate and the mechanical strength of thin films is too low to allow the scintillator to be handled. It is therefore difficult to find a material that performs well for the functions of both substrate and reflector.

Two main types of production are used to make the association between the scintillator and the photodiode array: direct evaporation and transferred scintillator.

The thallium-doped cesium iodide (CsI:Tl) scintillator may be evaporated directly onto the photodiode array, in this case it is the glass plate which takes the place of the substrate. To protect the plate, which has limited heat resistance, the rate of growth must be low: this leads to long production times. In addition, in the event of a defect during evaporation or post-treatments, the entire panel is rejected. Since photodiode arrays are expensive, the cost of rejection is high.

During evaporation, the initial layer of CsI:Tl, close to the substrate, is poorly structured as needles. With direct evaporation, this layer is located on the side of the photodiode array and limits the performance of the detector because it creates additional reflection. However, in this configuration, the reflector is placed on or bonded to the CsI needles and the choice thereof is not affected by the constraints for producing the scintillator.

The transferred scintillator solution does not impose the constraints for producing the scintillator on the photodiode array, but the reflector, which is also the substrate, must meet the constraints for producing the scintillator. The most common substrates are aluminum and graphite.

Aluminum has good heat resistance but its density is high, which results in fairly high weight and X-ray absorption. The sheets used are relatively thick to allow handling during the CsI deposition process and when joining to a photodiode array, which is not favorable for the overall weight of the detector. Its reflectivity is high but is not close to 100%. Its coefficient of thermal expansion is quite different from that of the photodiode array, which may lead to faults during thermal cycles or if the temperature of the detector varies in use.

A graphite substrate has good heat resistance with low X-ray absorption. Its drawbacks are poor reflectivity which leads to low sensitivity. It is not available with low thickness and tends to contaminate its environment, leaving a thin layer of carbon on contact.

U.S. Pat. No. 8,779,364 describes a method for producing a scintillator panel with a step of growing the scintillator on a first substrate, a step of attaching a second substrate on the needle side, a step of separating the first substrate and a step of removing a first layer of growth of the scintillator initially at the base of the first substrate. This method aims to remove the initial layer of growth of the scintillator which does not have advantageous optical properties, by means of a mechanical action such as mechanical polishing, or laser cutting, and requires the application of a second substrate before the removal of the first substrate. This second substrate acts as a protective substrate for the scintillator.

SUMMARY OF THE INVENTION

The invention aims to overcome all or some of the problems mentioned above by proposing a method for producing a solid-state digital detector of incident radiation that dissociates the functions of scintillator evaporation substrate and of reflector.

To that end, the invention relates to a method for producing a solid-state digital detector of incident radiation comprising a photosensitive sensor and a radiation converter, comprising a step of growing on a first substrate a scintillating substance from the first substrate, capable of converting the incident radiation into a second radiation to which the sensor is sensitive, the scintillating substance comprising an upstream front face in the direction of propagation of the incident radiation, through which the incident radiation passes, and a downstream front face in the direction of propagation of the incident radiation, opposite the upstream front face; a step of holding the scintillator at the downstream front face of the scintillating substance; a step of separating the first substrate from the scintillator.

The production method according to the invention may comprise a step of applying a reflector to the scintillator at the upstream front face.

According to one embodiment, the step of separating the first substrate from the scintillator is performed by peeling or using means capable of weakening the bond between the scintillator and the first substrate.

Advantageously, the step of applying the reflector to the scintillator comprises a step of placing the reflector on the scintillator at the upstream front face or of pressing the reflector onto the scintillator at the upstream front face with a predetermined pressure or of bonding the reflector to the scintillator at the upstream front face or of implementing a technique for depositing a thin film acting as a reflector.

According to one embodiment, the step of separating the first substrate from the scintillator may comprise a step of removing a first region from the scintillator which has a thickness less than a predefined nominal thickness.

The scintillator being intended to be applied to a previously defined area, the step of separating the first substrate from the scintillator may comprise a step of removing a second region from the scintillator, the downstream front face of which is located outside the previously defined area.

The step of holding the scintillator at the downstream front face of the scintillating substance may comprise a step of bonding the scintillator to the photosensitive sensor; or of vacuum suction; or of mechanical holding, or electrostatic interaction.

Advantageously, the reflector has a thickness of less than 200 micrometers, preferably less than 100 nanometers.

According to one embodiment, the first substrate may be replaced with a non-reflective absorbent surface instead of the reflector.

The invention also relates to a solid-state digital detector of incident radiation comprising a photosensitive sensor and a scintillator obtained using the production method according to the invention.

BRIEF DESCRIPTION OF THE DRAWINGS

The invention will be understood better and further advantages will become apparent from reading the detailed description of an embodiment given by way of example, this description being illustrated by the appended drawing, in which.

DETAILED DESCRIPTION

In these figures, for the sake of clarity, scale is not observed. Moreover, the same elements will bear the same references in the various figures.

Figure 1:
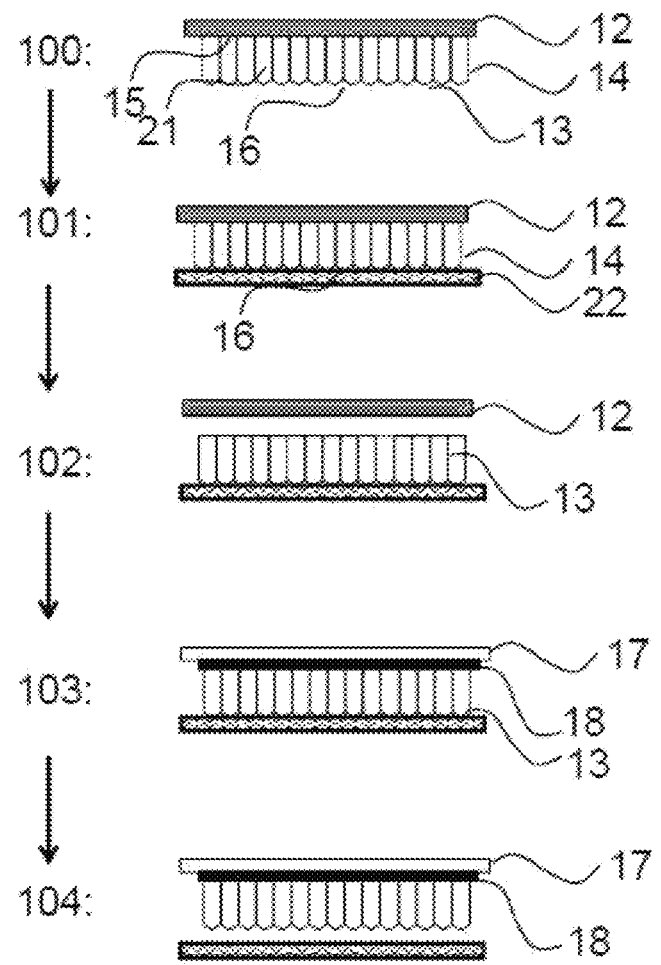
FIG. 1 schematically shows the steps of the method for producing a solid-state digital detector of incident radiation comprising a photosensitive sensor according to the invention.
Figure 2:
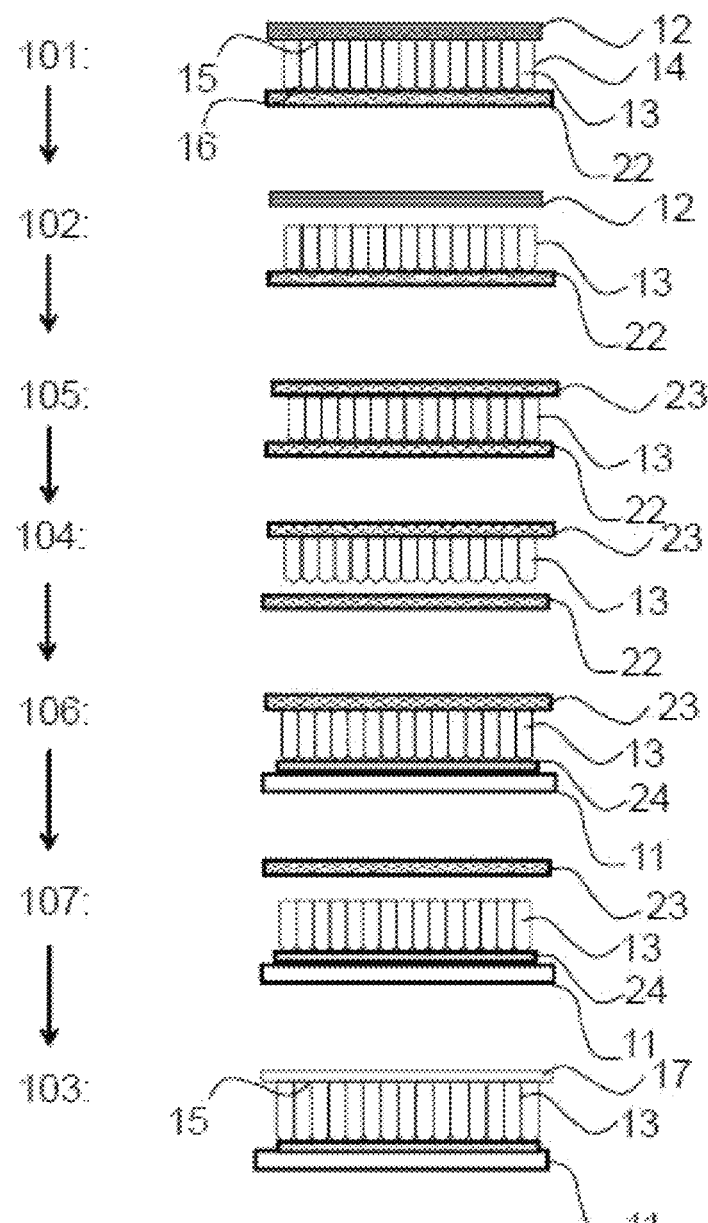
FIG. 2 schematically shows the steps of one variant of the method according to the invention.
Figure 3:
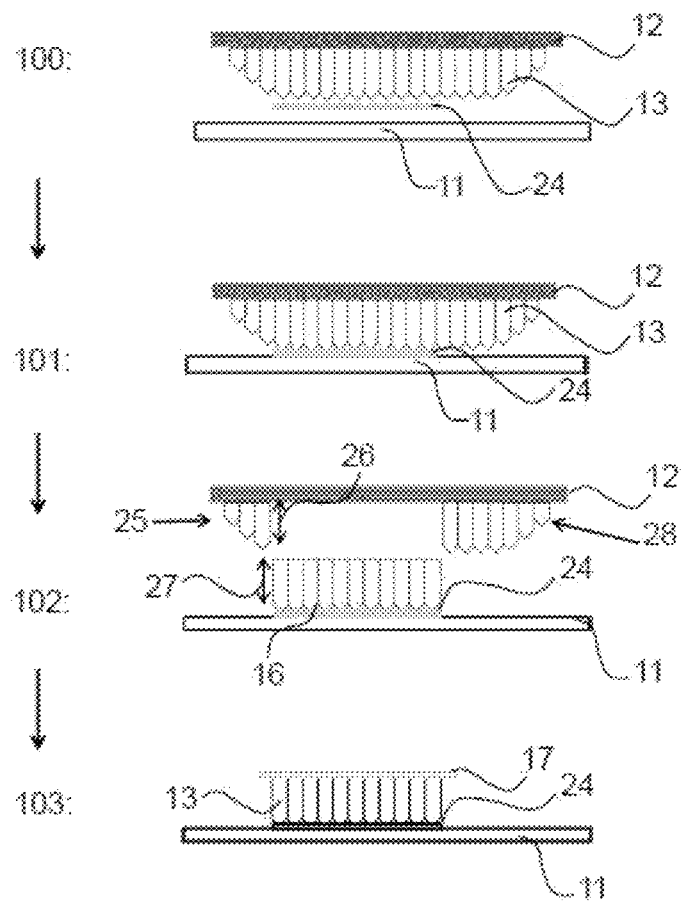
FIG. 3 schematically shows the steps of another variant of the method with removal of at least part of the scintillator according to the invention.

FIGS. 1 to 3 show the steps of the method for producing a digital detector according to the invention. Next to the reference for the step, the state of the elements that make up the detector according to the associated step is schematically shown, in order to allow better visualization of the method according to the invention.

FIG. 1 schematically shows the steps of the method for producing a solid-state digital detector of incident radiation comprising a photosensitive sensor according to the invention. The method for producing a solid-state digital detector 10 of incident radiation comprising a photosensitive sensor 11 (not visible in FIG. 1) comprises a step 100 of growing, on a first substrate 12, a scintillator 13 (also called a radiation converter) comprising a scintillating substance 14 extending in the form of needles 21 from the first substrate 12, capable of converting the incident radiation into a second radiation to which the sensor 11 is sensitive. The scintillating substance 14 comprises an upstream front face 15 in the direction of propagation of the incident radiation, through which the incident radiation passes, and a downstream front face 16 in the direction of propagation of the incident radiation, opposite the upstream front face 15. The upstream 15 and downstream 16 front faces may be planar, but they may also be irregular depending on the shape of the scintillating substance 14. The scintillator 13 may thus be evaporated onto a first substrate 12 suitable for growth even if this first substrate 12 does not perform well as a reflector. Even though the most common scintillator is CsI:Tl, any scintillating material may use this invention (e.g. CsI:Na, CsBr, $GdO_2S_2$:Tb, perovskite, etc.). The scintillator 13 may be bare or coated with an organic or inorganic protective layer. The scintillating substance 14 is advantageously in the form of fine needles which are grown on a carrier, also called a substrate. These needles are substantially perpendicular to this carrier and they partially confine the light emitted toward the sensor. However, the invention applies similarly to cases where the needles 21 are not perpendicular to the first substrate 12. The invention also applies to the case where the scintillator is not in the form of needles.

The step 100 of growing the scintillator 13 on the first substrate 12 may be carried out via an evaporation method, via sublimation, via plasma deposition, via sputtering, or via growth in a liquid medium with evaporation of a solvent or via any other means. The scintillator 13 may be bare or protected by an organic or inorganic protective layer.

The method according to the invention comprises a step 101 of holding the scintillator 13 at the downstream front face 16 of the scintillating substance 14. In other words, the scintillator is held on the side opposite the first substrate 12, on the side of the head of the needles 21, that is to say on the side of the free end of the needles 21. The step 101 of holding the scintillator 13 at the downstream front face 16 of the scintillating substance 14 may comprise a step of bonding the scintillator 13 to the photosensitive sensor 11. Or else, the step 101 of holding the scintillator 13 at the downstream front face 16 of the scintillating substance 14 may comprise a step of vacuum suction, or any other suitable means (mechanical, electrostatic, etc.). The element 22 in FIG. 1 represents a first element for holding the scintillator 13 used for carrying out the holding step 101.

The method according to the invention comprises a step 102 of separating the first substrate 12 from the scintillator 13. The step 102 of separating the first substrate 12 from the scintillator 13 may be carried out by peeling, or else by any other means aimed at weakening the bond between the scintillator 13 and the first substrate 12 with a view to removing the first substrate 12, via a chemical or mechanical method, by machining, or by removing an intermediate layer, through blowing, suction or traction, peeling being preferred since it is a straightforward method to implement. During the peeling step, it is important that the force applied to the scintillator 13 to hold it is greater than the peeling force. Care will therefore be taken to optimize the bonding of the scintillator material 14 to its first substrate 12, which bonding must be sufficient for the scintillator 13 to be held in place but weak enough to allow its removal.

The method according to the invention may comprise a step 103 of applying a reflector 17 to the scintillator 13 at the upstream front face 15. The reflector 17 is chosen judiciously. It may easily be lightweight, thin, and relatively X-ray non-absorbent because it does not have to meet the constraints for producing the scintillator 13. A wide choice of materials is available.

The reflector 17 may be a metallic, inorganic or organic material. It may also be multilayered to prevent corrosion of the reflective element by the CsI or complex (composite type), etc.

The reflector 17 is not necessarily a specific part, and it may also be formed by other parts already present in the detector such as, for example, the entry window or the packaging for the detector.

It is not strictly necessary to apply a reflector 17. If it is not sought to have much in the way of signal, it is also possible to leave the scintillator 13 bare, but the application of a reflector 17 makes it possible to maximize the amount of light received by the photodiode array. It may also be chosen to use an absorbent material to optimize spatial resolution at the expense of sensitivity.

The step 103 of applying the reflector 17 to the scintillator 13 may comprise a step of placing the reflector 17 on the scintillator 13 at the upstream front face 15. The step 103 of applying the reflector 17 to the scintillator 13 may comprise a step of pressing the reflector 17 onto the scintillator 13 at the upstream front face 15 with a predetermined pressure. Else, the step 103 of applying the reflector 17 to the scintillator 13 may comprise a step of bonding the reflector 17 to the scintillator 13 at the upstream front face 15. The reflector 17 may be associated with the scintillator by means of any other deposition method: screen printing, thermobonding, evaporation, sputtering, or deposition of a layer of metal or polymer using a thin-layer deposition method.

It is important to note that the invention also applies if it is not desired to deposit a reflector 17 on the scintillator 13. In this case, the amount of X-rays reaching the scintillator 13 is maximum, but some of the light emitted by the scintillator 13 may escape. The reflective function is not necessarily provided by a specific part of the detector. The light may be reflected by the entry window or the cover, or any other part of the detector. It is also possible to choose to place an absorbent material on the scintillator instead of a reflector to promote spatial resolution at the expense of sensitivity. The choice of the type of reflector 17 is guided by the intended use of the detector.

Lastly, the method according to the invention may comprise a step 104 of releasing the scintillator 13 for joining to a panel by bonding or pressing.

The principle of the invention is based on the dissociation of the functions of growth substrate and of reflector in a transferred scintillator solution, so as not to be affected by the drawbacks associated with direct evaporation. The reflector 17 (or absorbent) is chosen freely independently of all of the constraints for producing the scintillator 13: vacuum, mechanical, thermal resistance, etc. It is therefore possible to use a wide choice of materials including polymers. The reflector 17 does not have the mechanical function of holding the needles 21 of the scintillating substance 14 so it may be very thin and have very low rigidity. For example, the reflector 17 may have a thickness of less than 200 micrometers, or even less than 100 nanometers. Thus, it could be lightweight for portable applications and exhibit low X-ray absorption. To match its coefficient of expansion to that of the photodiode array, a very thin metallized glass may be considered, whereas this fragile material is difficult to reconcile with the function of first growth substrate 12. The first growth substrate 12 may also be simplified since it is no longer present in the detector, and it no longer needs to be reflective, lightweight or to transmit X-rays.

FIG. 2 schematically shows the steps of one variant of the method according to the invention. In this variant, after the step 100 of growing the scintillator 13 on the first substrate 12, the step 101 of holding the scintillator 13 at the downstream front face 16 of the scintillating substance 14 and the step 102 of separation of the first substrate 12 from the scintillator 13 take place. These steps are similar to the steps explained above. Next, the method may comprise a step 105 of holding the assembly composed of the scintillator 13 and of the first element 22. The holding step 105 may be carried out in various ways, like for the step 101. The element 23 represents a second holding element representing the implementation of the holding step 105. Next, the method according to the invention comprises, in this variant, a step 104 of releasing the scintillator 13 from the first element 22. In other words, the scintillator 13 held by the second element 23 is separated from the first element 22. In this variant, there follows a step 106 of applying the scintillator 13 to the photosensitive sensor 11. This application step 106 is carried out, for example, by bonding using glue 24 or any other solid or liquid adhesive to the photodiode array. This adhesive may be deposited on the plate or on the scintillator 13. The photodiode array is a rigid plate or a flexible plate bonded to a reinforcement or mechanically held on a rigid carrier. Finally, the separation step 102 takes place, to separate the second element 23. This variant of the method is advantageous if it is not desired to immediately bond a reflector 17 to the scintillator. A second holding element 23 (electrostatic, vacuum or other) is thus used to hold the scintillator 13 on the start-of-growth side, releasing the needle heads 21 before bonding them to the photodiodes array and applying or otherwise a reflector 17 by bonding or pressing.

During the steps of holding the scintillator 13, other means for holding the needles 21 are conceivable, provided that the force of bonding of the needle heads 21 to their substrate is greater than the force of bonding of the needles 21 to the first growth substrate 12 so that removal of the first substrate 12 is possible. In terms of other means for holding the needles 21, mention may be made (in a non-exhaustive list) of holding by means of electrostatic interaction, holding by means of a vacuum suction system by sucking via nozzles or through a pressure distributor. The scintillator 13 is then placed with its needle heads 21 on the holding element, the suction or the interaction is implemented by the corresponding apparatus and the first substrate 12 is peeled off or removed using another means. What is then obtained is a scintillator 13 without substrate which is difficult to handle, because the needles 21 of the scintillator 13 are not appreciably linked to one another. A reflector 17 then has to be applied on the start-of-growth side of the needles 21, that is to say at the upstream front face 15, in order to obtain a handleable scintillator 13. This new scintillator 13 may then be bonded to or simply placed on or pressed onto the photodiode array.

FIG. 3 schematically shows the steps of another variant of the method with removal of at least part of the scintillator according to the invention. In this variant, the step 102 of separating the first substrate 12 from the scintillator 13 comprises a step of removing a first region 25 from the scintillator 13 which has a thickness 26 less than a predefined nominal thickness 27. The scintillator 13 is produced by growing: in this step, the first substrate 12 is held by a frame. At the edges of the scintillator 13, the thickness of the scintillating substance 14 increases from zero to its nominal value 27 with a certain slope. This region 25, called the establishment region, which is a few millimeters in width, may be troublesome if it is desired to keep a small distance between the edge of the detector and the first pixel. In the holding step 101, this region 25 is not held. For example, in the case of bonding, this region 25 is not touched by the adhesive. It remains on the first substrate 12 during the removal thereof (step 102) and is therefore no longer present on the panel. This invention remains applicable in the case of a scintillator 13 that does not have an establishment region 25, either because the scintillator 13 is held without a frame, or because the establishment region 25 has already been removed.

The step 102 of separating the first substrate 12 from the scintillator 13 may comprise a step of removing a second region 28 from the scintillator 13. The scintillator 13 is intended to be applied to a previously defined area. The second region 28 of the scintillator 13 is the region of the scintillator 13 of which the downstream front face 16 is located outside the previously defined area. In other words, a certain format of the scintillator 13 is desired to cover a predefined area of a sensor, and all of the portion of the scintillator 13 outside this format is removed.

This solution makes it possible to remove the first growth substrate 12 from the scintillator 13 and to replace it with a reflector 17 which is more advantageous for the detector. This results in numerous advantages: gain in sensitivity of the detector if a material with a coefficient of reflection higher than that of the first growth substrate 12 is used, lightening the weight of the detector through the use of a thin and lightweight material, less X-ray absorption resulting in better DQE (detective quantum efficiency), better heat resistance of the detector by matching the coefficient of expansion of the reflector to that of the photodiode array.

The optical properties of the new reflector 17 may be adapted to the needs of the detector and other functions may be added to the reflector 17 (electrical, modulation of the optical properties, etc.). The first growth substrate 12 may also be simplified because it no longer has to meet the constraints of the detector.

Thus, the invention consists in dissociating the functions of growth substrate 12 and of reflector 17 in an X-ray detector comprising a transferred scintillator 13. The function of growth substrate 12 requires a rigid material to be able to be handleable and compatible with deposition of scintillator material. The function of reflector 17 in the detector requires not only a material that is reflective of light but that also exhibits low X-ray absorption, a light weight, and a coefficient of expansion matched to that of the photodiode array, which is generally incompatible with the function of substrate 12. Conventional transferred scintillators are based on a trade-off between the properties required for the two functions. The solution proposed in this invention makes it possible to avoid this trade-off and to choose materials suitable for the two functions separately.

Another advantage of the invention is the elimination of bonding defects during the removal of the first substrate 12. Specifically, when the scintillator 13 is bonded to the photodiode array with its first substrate 12, the rigidity of the substrate 12 and inhomogeneities in the thickness of the scintillator 13 may lead to bonding defects. After removal of the first substrate 12, the CsI needles descend back into the bonding material as soon as the slightest pressure is applied and bonding defects are greatly reduced or disappear. This advantage also applies to photodiode arrays produced on flexible or organic substrates or those which are produced on flexible carriers. The pressure applied during the bonding of the scintillator 13 may generate stresses and deform the flexible plate: this deformation disappears as soon as the substrate 12 is removed.

The removal of the scintillator 13 may also provide a solution to the problem of differential expansions between the plate and the scintillator 13. There are then fewer constraints on the choice of reflector 17 because it no longer has to perform the function of first substrate 12, and it is therefore easier to choose a reflector 17 of which the coefficient of expansion is matched to that of the plate. The new reflector 17 may be chosen so as not to react chemically with the deposited scintillator material. Its optical properties may be freely optimized according to the desired performance for the detector by adjusting its coefficient of reflection or by choosing an absorbent material. New functions could also be added to this reflector depending on the needs of the detector.

Figure 4:
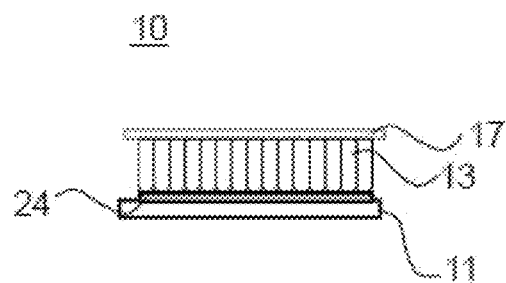
FIG. 4 schematically shows a detector obtained using the production method according to the invention.

FIG. 4 schematically shows a detector 10 obtained using the production method according to the invention. The solid-state digital detector 10 of incident radiation comprises a photosensitive sensor 11 and a scintillator 13 obtained using the production method described above.

The production method according to the invention makes it possible to combine the advantages of the rigid and temperature-resistant growth substrate with those of the lightweight and X-ray-transparent reflector by dissociating the functions of growth substrate and of reflector.

The scintillator is held by its needles in a suitable adhesive in order to remove the growth substrate, or any other suitable holding means.

The production method according to the invention affords the possibility of separation from the scintillator establishment region, and any region lying outside the predefined format.

It is also possible to eliminate bonding defects during peeling or removal of the growth substrate.

The reflector may be chosen quite freely from among thin, lightweight materials, which do not necessarily exhibit high rigidity or need to meet the constraints for producing the scintillator. The growth substrate may also be chosen freely without taking the constraints for the detector into account.

By choosing the reflector judiciously, the production method according to the invention makes it possible to obtain a detector in which there is no differential expansion between the reflector and the photodiode array.

Lastly, other possibilities are possible by virtue of such a method: working without a reflector or using a part present in the detector as a reflector, placing an absorbent material on the detector to promote spatial resolution at the expense of sensitivity, adding new functions to the reflector which were not achievable using methods of the prior art where the growth substrate is also the reflector.

The invention claimed is:

1. A method for producing a solid-state digital detector of incident radiation comprising a photosensitive sensor and a scintillator, comprising:
   a) a step of growing on a first substrate a scintillating substance from the first substrate, capable of converting the incident radiation into a second radiation to which the sensor is sensitive, the scintillating substance comprising an upstream front face in the direction of propagation of the incident radiation, through which the incident radiation passes, and a downstream front face in the direction of propagation of the incident radiation, opposite the upstream front face;
   b) a step of holding the scintillator at the downstream front face of the scintillating substance;
   c) a step of separating the first substrate from the scintillator,
      wherein the step of separating the first substrate from the scintillator comprises a step of removing a first part of the scintillating substance occupying a first region of the scintillator, said first part of the scintillating substance which has a thickness less than a predefined nominal thickness, and said first region being at the edges of the scintillator; and
      wherein the step of removing the first part of the scintillating substance being performed simultaneously with the step of separating the first substrate from the scintillator.

2. The production method as claimed in claim 1, comprising a step of applying a reflector to the scintillator at the upstream front face.

3. The production method as claimed in claim 1, wherein the step of separating the first substrate from the scintillator is performed by peeling or using means capable of weakening the bond between the scintillator and the first substrate.

4. The production method as claimed in claim 2, comprising a Step of applying a reflector to the scintillator at the upstream front face, wherein the step of applying the reflector to the scintillator comprises a step of:
   a) placing the reflector on the scintillator at the upstream front face; or
   b) pressing the reflector onto the scintillator at the upstream front face with a predetermined pressure; or
   c) bonding the reflector to the scintillator at the upstream front face; or
   d) implementing a technique for depositing a thin film acting as a reflector.

5. The production method as claimed in claim 2, wherein the scintillator is intended to be applied to a previously defined area, and in that the step of separating the first substrate from the scintillator comprises a step of removing a second region from the scintillator, the downstream front face of which is located outside the previously defined area.

6. The production method as claimed in claim 1, wherein the step of holding the scintillator at the downstream front face of the scintillating substance comprises a step of:
   a) bonding the scintillator to the photosensitive sensor; or
   b) vacuum suction; or
   c) mechanical holding, or electrostatic interaction.

7. The production method as claimed in claim 2, comprising a step of applying a reflector to the scintillator at the upstream front face, wherein the reflector has a thickness of less than 200 micrometers.

8. The production method as claimed in claim 1, comprising a step of applying a non-reflective absorbent surface to the scintillator at the upstream front face.

9. A solid-state digital detector of incident radiation comprising a photosensitive sensor and a scintillator obtained using the production method as claimed in claim 1.

* * * * *